(12) United States Patent
Hermann et al.

(10) Patent No.: US 7,156,993 B2
(45) Date of Patent: Jan. 2, 2007

(54) MEMBRANE, MEMBRANE PLATE AND CHAMBER PLATE FOR A FILTER PRESS

(75) Inventors: Manfred Hermann, Nürnberg (DE); Ulrich Knye, Georgensgmünd (DE); Bernhard Salbaum, Mühlstetten (DE)

(73) Assignee: JVK Filtration Systems GmbH, Georgensgmuend (DE)

( * ) Notice: Subject to any disclaimer, the term of this patent is extended or adjusted under 35 U.S.C. 154(b) by 0 days.

(21) Appl. No.: 10/823,226

(22) Filed: Apr. 12, 2004

(65) Prior Publication Data

US 2004/0188336 A1 Sep. 30, 2004

Related U.S. Application Data

(63) Continuation of application No. PCT/EP03/04635, filed on May 2, 2003.

(30) Foreign Application Priority Data

May 10, 2002 (DE) .................. 102 21 061

(51) Int. Cl.
*B01D 25/21* (2006.01)
(52) U.S. Cl. .................... 210/231
(58) Field of Classification Search .......... 210/224, 210/225, 227, 229, 230, 231; 100/194
See application file for complete search history.

(56) References Cited

U.S. PATENT DOCUMENTS 4,911,839 A * 3/1990 Davis .................. 210/231
5,198,123 A * 3/1993 Stover et al. ............... 210/791
5,558,773 A * 9/1996 Aigeldinger et al. ........ 210/770
5,601,709 A * 2/1997 Ruhland ..................... 210/228
5,658,468 A * 8/1997 Tigel Gil et al. ............ 210/770
6,460,300 B1 * 10/2002 Mikkaichi et al. ..... 52/204.597

FOREIGN PATENT DOCUMENTS

| DE | 27 54 537 A1 | 6/1979 |
| DE | 35 07 063 C1 | 5/1986 |
| DE | 39 32 422 A1 | 4/1991 |
| DE | 41 19 166 A1 | 12/1992 |
| DE | 196 36 436 A1 | 3/1998 |
| EP | 0 978 304 A2 | 2/2000 |
| GB | 1 505 713 | 3/1978 |
| GB | 1 583 198 | 1/1981 |

* cited by examiner

*Primary Examiner*—Terry K. Cecil
(74) *Attorney, Agent, or Firm*—Laurence A. Greenberg; Werner H. Stemer; Ralph E. Locher

(57) ABSTRACT

In order to provide a filter press which operates especially reliably and free of wear, a membrane for a membrane plate has a membrane surface enclosed by a membrane margin which is free of perforations. Furthermore, a membrane plate has such a membrane. Moreover, a chamber plate has a number of sludge inflows, each with an inflow orifice spaced apart from the chamber plate margin. Finally, a plate stack has a number of membrane plates and/or a number of chamber plates and also a corresponding filter press.

19 Claims, 4 Drawing Sheets

MEMBRANE, MEMBRANE PLATE AND CHAMBER PLATE FOR A FILTER PRESS

CROSS-REFERENCE TO RELATED APPLICATION

This application is a continuation of copending International Application No. PCT/EP03/04635, filed May 2, 2003, which designated the United States.

BACKGROUND OF THE INVENTION

Field of the Invention

The invention relates to a membrane for a membrane plate, to a membrane plate and to a chamber plate for a filter press. The invention relates, furthermore, to a filter press.

Membrane filter presses with an exchangeable membrane for solid/liquid separation are known from the prior art. Filter presses of this type can be employed in many different fields of use, for example sewage, chemistry, foodstuffs, metallurgy, pharmacy, etc. Chamber filter presses have filtration chambers that are formed by specially shaped plates. In this case, each chamber is provided at least on one side with a membrane. Every second plate can thus be configured as a membrane plate covered on both sides with membranes. If, then, a suspension flows under pressure into the closed filter press, a filter cake builds up on the filter, until the two cake layers have coalesced and the chambers have filled completely with solid. This first step of pressure filtration is followed by a second step, press filtration. In press filtration, the elastic membranes are inflated by a pressure medium, so that they expand and narrow the cake space. In this case, the cake embedded there is compressed, with the result that the residual moisture in the cavities of the cake is further reduced. By the use of press filtration, extremely high filtration pressures can be avoided during pressure filtration, thus leading to a saving in terms of investment costs and energy costs.

To seal off the membrane in the membrane carrier plate, the membrane is provided with a peripheral bead that is introduced into and held in a likewise peripheral groove of the carrier plate. Under pressures of above 15 bar, however, the bead may be deformed in such a way that sealing no longer takes place and the pressure medium, for example air or water, can escape outward.

In the known membrane plates, the membrane has an orifice, through which the sludge enters the filtration chamber. The membrane is in this case sealed off and fastened around the sludge bore. It has a sealing bead at this point and, furthermore, is connected to the membrane carrier plate by a flange or a clamping ring or clamping tube. In the region around the sludge inlet point, no cake or only a thin soft cake is formed during filtration. In the subsequent pressing operation, the membrane is then pressed into this depression in the cake and further on into the sludge bore. The fastening of the membrane in this region may cause the membrane to be overstretched at this point under pressures of above 15 bar and to tear apart after a short operating period or else be pulled out of the fastening.

SUMMARY OF THE INVENTION

It is accordingly an object of the invention to provide a membrane, a membrane plate and a chamber plate for a filter press that overcome the above-mentioned disadvantages of the prior art devices of this general type, which operate particularly reliably and free of wear.

With the foregoing and other objects in view there is provided, in accordance with the invention, a membrane for a membrane plate of a filter press. The membrane contains a membrane surface without perforations and having a plurality of supporting elements being ribs or bosses. The supporting elements each have a given surface. A membrane margin encloses the membrane surface. At least one planar region is disposed spaced apart from the membrane margin and has a surface larger than the given surface of one of the supporting elements and is positioned disposed opposite to a sludge inflow in a final mounting state with the membrane plate.

The membrane according to the invention for the membrane plate, for insertion in a filter press, has a membrane surface which is enclosed by a membrane margin and which is free of perforations. The membrane is thus held solely by the press closing force of the opposite plate. No additional fastening elements, such as, for example, screws, flanges, rings or clamps, are provided for fixing the membrane to the membrane carrier plate. The opposite plate serves in this case as a stay. A more rapid mounting and dismounting of the membrane are thus possible. Owing to the simple geometry of the effective membrane surface, a homogeneous cake buildup is achieved. When the filter cake is washed out after filtration, a more uniform washing out can be achieved, since, due to the homogeneous cake buildup, channel or crack formations in the filter cake are avoided. The membrane material used is, for example, special polyethylene (PE), polypropylene (PP) or polyvinylidenefluoride (PVDF) materials, with the result that a good chemical resistance of the membrane, even at high temperatures, is achieved. Other special elastomers, such as EPDM, NBR, SBR, VITON, etc., may, however, also be used. During filtration, the highly elastic membrane adapts to the method-related unevennesses of the cake surface and to the different packing densities in the cake easily, without any permanent deformations, with the result that a uniform and more intensive expressing of the cake takes place.

The membrane has a multiplicity of supporting elements. These supporting elements, configured in the manner of ribs or bosses, lead to a channeling of the membrane surface, the channeling serving for supporting the filter cloth formed preferably of felt or textile fabric and allowing the filtrate to flow out. The membrane surface is in this case preferably inert and hydrophobic. Since it also has a dirt-repelling action, a clogging of the outflow ducts is delayed or prevented. Furthermore, the surface of the supporting elements is relatively smooth, so that the load on the filter cloth due to friction between the filter cloth and the membrane surface is low.

In a preferred embodiment, the membrane has a substantially planar region, the surface of which is larger than the surface of a supporting element. The planar region is in this case disposed so as to be spaced apart from the membrane margin. In the final mounting position of the plate stack, the planar region serves, inter alia, for distributing uniformly in all directions the sludge admitted into the filtration chamber and, for this purpose, in the final mounting position, is disposed opposite a sludge inflow.

In the embodiment of the invention, the planar region has a reinforcement. This serves primarily for ensuring that the membrane, in its operating position, is not pressed into the sludge inflow during press filtration.

Preferably, the reinforcement is a reinforced cross section of the membrane material, that is to say a thickening, in this region. The reinforcement of the membrane may be achieved alternatively or simultaneously in that a reinforcing material, formed of, for example, a plastic, metal or fabric, etc., is introduced into the membrane material. In both instances, the reinforcement of the membrane is preferably dimensioned such that, together with the supporting elements, a substantially plane membrane surface directed toward the filtration chamber and intended for supporting the filter cloth is formed.

In a further preferred embodiment of the invention, the membrane has a peripheral bead for engagement into a groove of a membrane carrier plate, the bead having integrally formed on it a sealing lip, the sealing lip material of which has a lower Shore hardness than the bead material. The bead in this case serves both for fixing the membrane in the membrane carrier plate and as a sealing bead for sealing off the plate stack. The preferably peripheral sealing lip, attached as a kind of sealing ring to the bead, serves in this case, in particular, for sealing off the pressure chamber between the membrane underside and the membrane carrier plate. The lip is connected in one piece to the bead. If plastics are used as the sealing lip material and the bead material, the sealing lip is preferably fused together with the bead.

The bead preferably serves at the same time as a support and therefore also as a seal between the membrane carrier plate and an adjacent plate, in particular a chamber plate.

It is advantageous, furthermore, to provide the membrane margin with respect to the membrane surface with a sealing strip. The sealing strip is preferably integrally formed in one piece on the bead material and serves for additionally sealing off the filter cloth lying on the membrane surface, in particular for the elimination of leakages between the membrane and the filter cloth.

Preferably, the bead material is identical to the membrane material. Therefore, the bead can be produced in a simple way together with the membrane. The bead and the membrane are in this case preferably produced in one piece.

In a particularly preferred embodiment, the bead material has a Shore hardness of about 90° ShA. Owing to this high hardness, the bead is not deformed, even under high pressures, thus leading to a particularly reliable functioning of the membranes. By contrast, the sealing lip material has a lower Shore hardness than the bead material. The Shore hardness of the sealing lip material preferably amounts to 70±5° ShA. The Shore hardness of the sealing lip material therefore differs from the Shore hardness of the bead material (90±5° ShA) by 10 to 25° ShA. The thus substantially softer sealing lip, when acted upon by pressure, is pressed onto the gap between the bead and the groove wall of the membrane carrier plate, thus leading to particularly reliable sealing off.

For particularly effective sealing off, the bead is configured in the manner of a U-shaped holding projection formed of a solid material, the sealing lip being integrally formed on the outer lower edge of the holding projection. In other words, the sealing lip is located in the gusset between the U-bottom and the U-leg, facing the margin of the membrane carrier plate, of the holding projection.

The sealing lip material and the bead material are in this case preferably configured differently in terms of color. As a result, it can easily be detected, both during the production of the membrane and during the maintenance of the membrane, whether the sealing lip is integrally formed on the bead, as desired, or whether an exchange of the membrane becomes necessary.

The membrane plate according to the invention has a membrane carrier plate with a carrier plate margin for contacting at least one chamber plate. When the membrane plate, preferably formed of a thermoplastic, such as PP, PE, PVDF or the like, or of a metal, in particular aluminum, contacts an adjacent chamber plate, a filtration chamber is formed between the membrane topside and the chamber plate. Furthermore, the membrane plate according to the invention has a membrane as described above. The margin of the membrane in this case ends in front of the carrier plate margin of the membrane carrier plate, the carrier plate margin serving as the actual sealing surface. The membrane is in this case inserted into a peripheral groove provided on the membrane carrier plate. The groove and bead in this case preferably form an uninterrupted holding or sealing ring. The groove or the bead may, however, also be interrupted by transverse elements, for example inflows or outflows. In other words, preferably, there is no firm connection by screwing or welding between the membrane and the membrane carrier plate in the region of the sealing margin. During press filtration, the pressure of the after-pressing medium can be maintained only with the filter press closed. If a membrane internal pressure prevails when the press is open or is opening, the membrane moves out of the groove, a safe release of pressure taking place, without the membrane being destroyed. The outlay for safety precautions is thereby considerably reduced.

The membrane plate according to the invention ensures a particularly reliable operation of the filter press due to the use of the membrane according to the invention that is exchangeable inside or outside the press. Since the membrane is not interrupted by a sludge inlet, during pressure filtration it can come to bear with its entire membrane underside onto the surface of the membrane carrier plate. This makes it possible to have an especially uniform buildup of the filter cake. Owing to the especially simple configuration both of the membrane and of the fixing of the membrane on the membrane carrier plate, the membrane plate can be produced particularly robustly and cost-effectively. The membrane plate is in this case suitable for all pressure media, such as, for example, air, water or oil.

A membrane plate that is constructed mirror-symmetrically about its longitudinal center axis, is especially advantageous. A membrane can thus be held on both sides of the membrane carrier plate, so that the membrane plate has two operative sides.

The chamber plate for a filter press, which, like the membrane plate, has a plate margin for contacting at least one adjacent plate, possesses a number of sludge inflows for introducing the sludge into the filtration chamber. According to the invention, at least one sludge inflow is provided for each chamber plate. However, a plurality of sludge inflows may also be disposed in a chamber plate. This is expedient especially where large plate sizes are concerned. The sludge inflow in this case has an inflow orifice that is disposed so as to be spaced apart from the chamber plate margin. Like the membrane plate, too, the chamber plate is formed of a thermoplastic or metal. The sludge inflow in the form of a duct or of a bore can therefore be worked into the chamber plate simply by machining. The filter cloth bearing on the chamber plate surface is advantageously fixed to the preferably round inflow orifice by a holding flange or a similar fastening element. It is advantageous, furthermore, that the filter cloth for the chamber plate can be produced particularly simply. Special machining of the orifice margins of the filter cloth orifice in the region of the inflow orifice is not necessary.

It is particularly advantageous if an individual connection is provided for each sludge delivery line on each chamber plate. For example, for supplying sludge to the individual filtration chambers, an external connecting line may be provided, to which the chamber plate is connected by releasable hoses. This affords a simple possibility of checking whether all chambers are filled with sludge. A reliable and uniform filling of the chambers is important, especially in the case of high pressures, so that uniform deflection of the membrane over the entire filter surface and consequently the least possible load on the membrane are ensured.

Preferably, the inflow orifice adjoins an inflow duct which serves as a sludge duct and which extends from the chamber plate margin into the chamber plate interior. The inflow duct in this case runs from the outside of the chamber plate margin as far as the inflow orifice and may in this case be disposed both parallel to the longitudinal direction of the chamber plate and at an angle thereto. An oblique configuration of the inflow duct leads, especially in conjunction with a conical cross-sectional run of the inflow duct, to an especially reliable filling of the filtration chamber with the sludge. The length of the inflow duct is dimensioned according to the size of the filtration chamber. The inflow duct is preferably dimensioned in such a way that the inflow orifice is at a sufficient distance from the margin of the filtration chamber to ensure a sufficiently uniform filling of the filtration chamber. On the other hand, too long an inflow duct is to be avoided, so as to avoid unnecessary contamination of the inflow duct and therefore the susceptibility of the latter to faults.

In a further preferred embodiment of the invention, an outlet duct extends, in the region of the inflow orifice, substantially perpendicularly to the longitudinal direction of the chamber plate. This ensures that the sludge emerging from the inflow orifice impinges substantially perpendicularly onto the opposite membrane of the membrane plate, in order to ensure a uniform distribution of the suspension in the filtration chamber.

Preferably, the sludge inflow has a non-return element, which is especially advantageous. The non-return element, which is preferably configured in the form of a non-return flap or a non-return valve, serves for shutting off the inflow orifice in the direction of the inflow duct. The sludge located in the filtration chamber or a soft filter cake therefore cannot escape through the inflow duct during expressing in the course of press filtration, with the result that a blockage is prevented. The membrane is likewise prevented from being pressed into the inflow orifice during press filtration.

The chamber plate is preferably constructed mirror-symmetrically about its longitudinal center axis. Therefore the inflow duct that is disposed centrally in the chamber plate has adjoining it two outlet ducts which at their ends form two inflow orifices into adjacent filtration chambers.

A plate stack according to the invention for a filter press has a number of membrane plates as mentioned above and a number of chamber plates also as mentioned above. The individual, mostly square plates are disposed alternately next to one another. The plate stack obtained as a result is preferably clamped on its entire circumference in a filter press frame between a fixed headpiece and a movable endpiece by a closing device. In this case, the plates are preferably disposed vertically.

Preferably, the inflow orifice in the chamber plate is disposed opposite to the planar region of the membrane. The planar region is in this case configured and disposed in such a way that it completely covers the inflow orifice. In other words, the planar region overlaps the orifice margins of the inflow orifice in the chamber plate when the outlet duct is viewed perpendicularly to the longitudinal direction of the chamber plate. During expressing in the course of press filtration, the membrane is therefore laid with the reinforcement onto the sludge inflow or into the region of the incompletely formed filter cake. The membrane is likewise prevented from being pressed into the inflow orifice during press filtration. The holding flange fixing the filter cloth to the chamber plate serves in this case additionally as a supporting surface for the membrane.

A filter press according to the invention ensures a particularly safe and reliable work sequence.

Since critical points are avoided with the perforation-free membrane, the membrane has a substantially higher load-bearing capacity and is consequently more reliable. A filter press according to the invention can therefore operate in a pressure range of up to at least 50 bar pressing pressure, without the membrane being subject to excessive load. Due to the high pressing pressure, the filtration time can be reduced considerably. However, even when a lower expressing pressure, for example up to 15 bar, is used in press filtration, the membrane according to the invention can be employed. All the individual parts of the invention can therefore be used both in the case of low pressures and in the case of extremely high pressures, thus ensuring universal use.

The membrane according to the invention can be employed both with a membrane plate according to the invention and with other membrane plates which allow this membrane to be used. The membrane plates according to the invention can likewise be employed both with the chamber plates according to the invention and with other chamber plates suitable for this purpose. The membrane plates and chamber plates according to the invention may also be employed in conventional filter presses, for example using deflection or adapter plates. Overall, a membrane chamber filter press with an uncomplicated construction, which is simple to maintain and has high functional reliability, is obtained.

It may be gathered from the foregoing that the present invention not only relates to the corresponding devices, but also to a method for operating a filter press.

Other features which are considered as characteristic for the invention are set forth in the appended claims.

Although the invention is illustrated and described herein as embodied in a membrane, a membrane plate and a chamber plate for a filter press, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
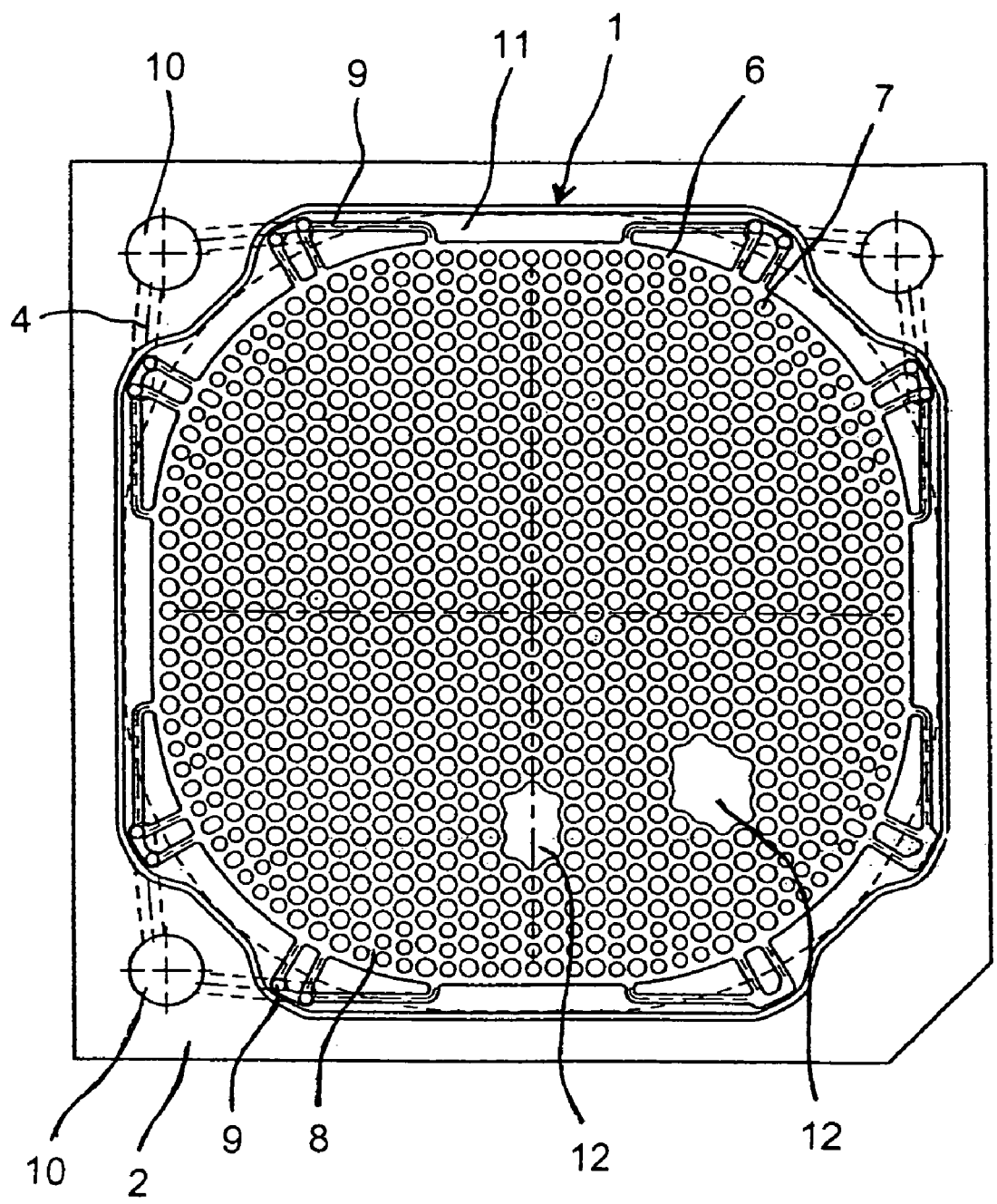
FIG. 1 is a diagrammatic, top plan view of a membrane according to the invention.

Referring now to the figures of the drawing in detail and first, particularly, to FIG. 1 thereof, there is shown a top view of a membrane 1 according to the invention. The membrane 1 is in this case fixed to a membrane carrier plate 2. In this case, a peripheral bead 4, illustrated in FIG. 1 by a broken line, which is attached to a membrane underside 3 engages into a correspondingly shaped groove 5 on the membrane carrier plate 2. A multiplicity of bosses 7 as supporting elements for a non-illustrated filter cloth are attached to a membrane surface 6. The boss interspaces form outflow ducts 8, through which the sludge can flow out during filtration. The outflow ducts 8 have adjoining them ducts which correspondingly lead further on and are in the form of outflow bores 9 which finally lead the sludge into corner bores 10 formed in the corners of the essentially square membrane carrier plate 2. The outflow ducts 8 and outflow bores 9 are dimensioned in such a way that even large filtrate quantities are delivered quickly and clogging or blockage by solids and/or crystallizing out are largely avoided. The bosses 7 are bordered by a membrane margin 11. Spaced apart from the membrane margin 11, on the membrane surface 6, are disposed plane or planar regions 12 which, as compared with an individual boss 7, have a larger surface that is not interrupted by an outflow interspace 8.

Figure 2:
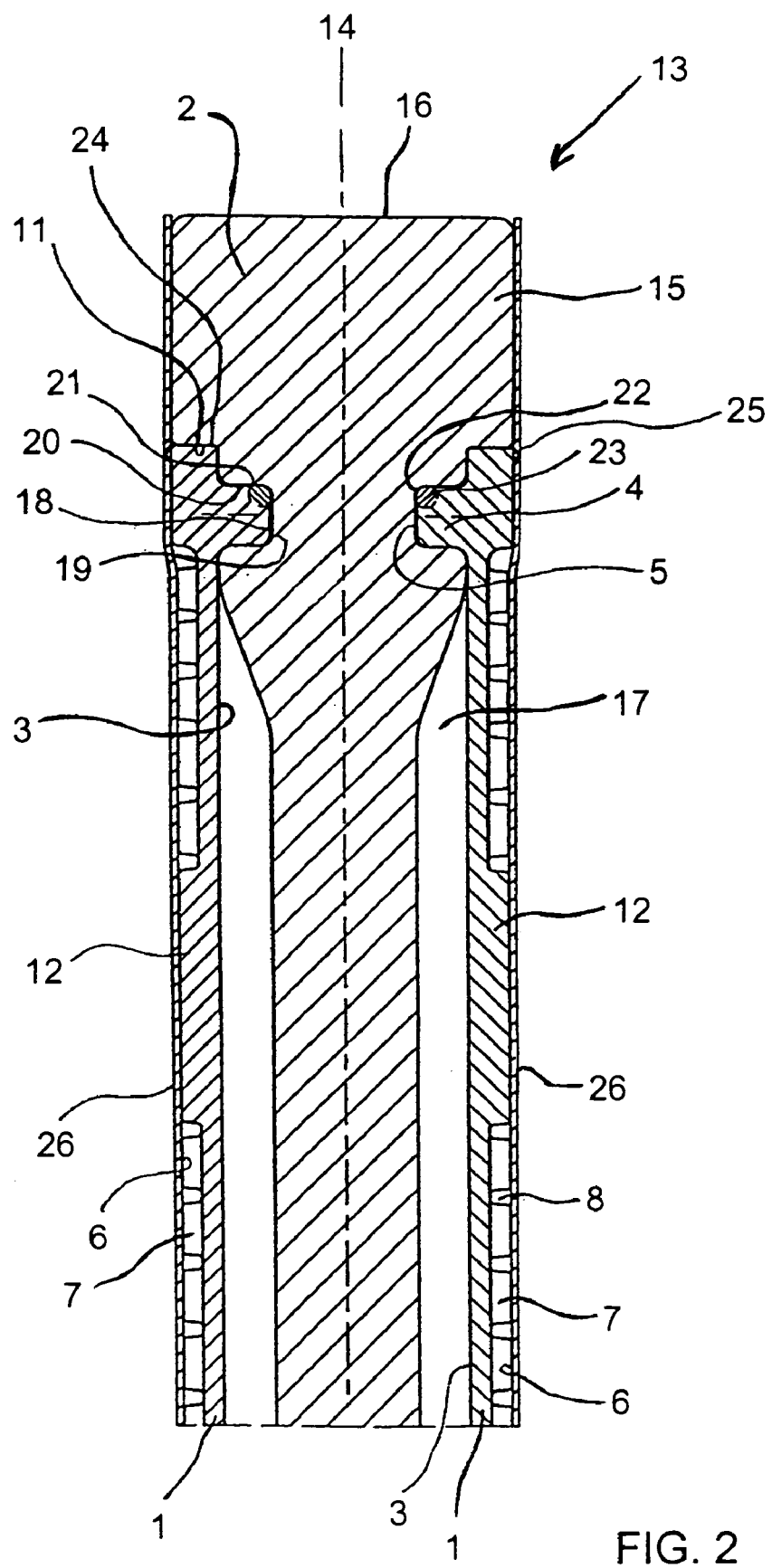
FIG. 2 is a diagrammatic, sectional view of a membrane plate according to the invention.

FIG. 2 shows a section through a membrane plate 13 according to the invention that is constructed mirror-symmetrically with respect to its longitudinal center axis 14. The membrane plate 13 in this case contains the membrane carrier plate 2 and two of the membranes 1 held on opposite sides of the membrane carrier plate 2. The membrane carrier plate 2 has a thickened membrane plate margin 15. The membrane plate margin 15 carries, spaced apart from an end face 16, a peripheral groove 5 having a substantially U-shaped cross section.

Adjacent to the groove 5 in the direction of the center of the membrane plate 13, the membrane carrier plate 2 narrows in cross section. As a result, a pressure chamber 17 is formed between the membrane carrier plate 2 and the membrane 1 held on the latter, the membrane underside 3 running substantially parallel to the membrane carrier plate 2 in the non-loaded state of rest. The pressure chamber 17 is connected to the collecting line of a pressure medium by an individual connection by a non-illustrated connecting bush attached to an end face 16 of the membrane carrier plate 2 from outside.

The peripheral bead 4 closing off the membrane 1 is of a substantially U-shaped configuration, in the final mounting position a U-bottom 18 runs substantially parallel to a bottom 19 of the groove 5 which bears on the U-bottom 18. Two U-legs 20 of the bead 4 bear simultaneously on groove walls 21, so that the bead 4 is seated in the groove 5 in the manner of a holding projection. The outer, that is to say end-face lower edge 20 of the holding projection has formed on it a sealing lip 23. The latter is connected in one piece to the bead material. In the position shown here, the press closing force of a non-illustrated opposite chamber plate prevails, so that the sealing lip 23, by virtue of its softness, is already pressed completely into the contour of the groove 5.

In the direction toward the end face 16 of the membrane plate 13, the membrane 1 is closed off by the membrane margin 11 that is seated in a receiving edge 24, provided for this purpose, of the membrane carrier plate 2. The membrane margin 11 is closed off toward the membrane surface 6 by a sealing strip 25 that is preferably integrally formed in one piece on the bead material. The sealing strip 25 serves for additional sealing off by a filter cloth 26 resting on the membrane surface 6, in particular for the elimination of leakages. The filter cloth 26 rests both on the individual bosses 7 of the membrane 1 and on the planar region 12 of the membrane 1. The planar region 12 is in this case reinforced by a thickening of the membrane material in such a way that the membrane 1 has the same cross-sectional thickness here as in the region of a boss 7.

Figure 3:
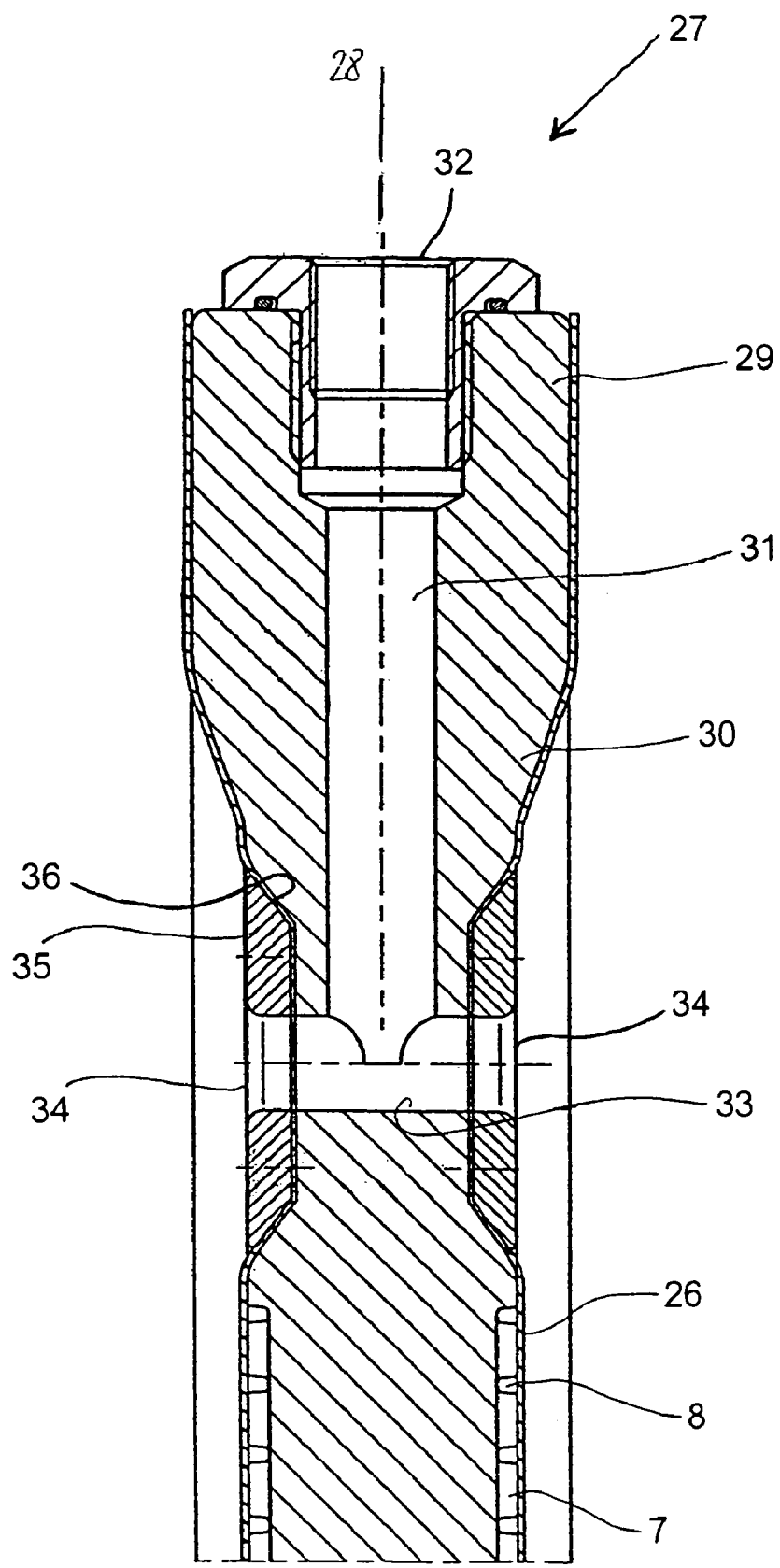
FIG. 3 is a diagrammatic, sectional view of a chamber plate according to the invention.

FIG. 3 shows a chamber plate 27 according to the invention that, like the membrane plate 13 in FIG. 2, is constructed mirror-symmetrically about its longitudinal center axis 28. The chamber plate 27 has a chamber plate margin 29 that, as in the case of the membrane plate 13, is thickened in a bead-like manner. In the final mounting position, the plate margins 15, 29 running parallel to one another bear in this case on one another and form a filtration chamber for receiving the suspension. The chamber plate margin 29 has adjoining it in the direction of the center of the chamber plate a sealing margin slope 30, along the run of which the cross section of the chamber plate 27 narrows, so that a filtration space is obtained between the chamber plate 27 and the membrane 1 of a non-illustrated adjacent membrane plate 2. Furthermore, the chamber plate 27 has disposed in it a sludge inflow that contains an inflow duct 31. The duct 31 leads from the end face 32 of the chamber plate 27 through the chamber plate margin 29 and the sealing margin slope 30 into an interior of the chamber plate 27. The duct 31 ends there in a T-shaped end-piece 33 which is closed off by two inflow orifices 34. The two inflow orifices 34 connect the inflow duct 31 to the two filtration chambers which lie on opposite sides of the chamber plate 27. The outlet duct 33 in this case extends in the region of the inflow orifice 34 substantially perpendicularly to the longitudinal direction of the chamber plate that runs parallel to the longitudinal center axis 28. Adjoining the region of the inflow orifice 34 in the direction of the center of the chamber plate 27, the chamber plate 27 has the bosses 7 which, as already known from the membrane 1, serve as supporting elements for the filter cloth 26 which covers the entire chamber plate surface. In the region of the inflow orifice 34, the filter cloth 26 is fixed to the chamber plate 27 by a holding flange 35. To receive the holding flange 35, the chamber plate 27 has a receiving region 36 that is obtained by a further narrowing of the cross section of the chamber plate 27. The holding flange 35 and the receiving region 36 are in this case configured in such a way that the surface of the holding flange 35 seated in the receptacle 36 lies in one plane with the surface of the bosses 7 of the chamber plate 27.

Figure 4:
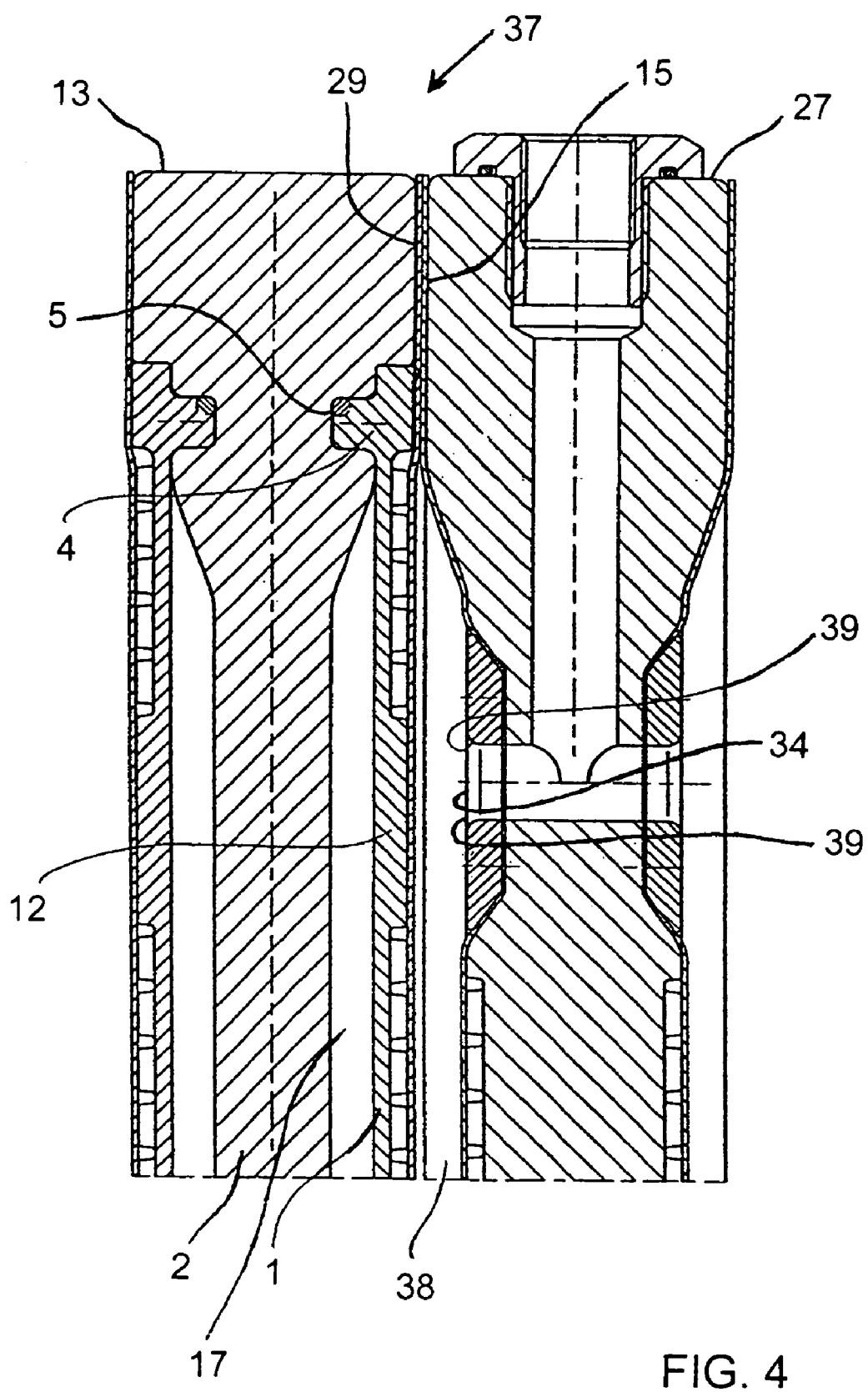
FIG. 4 is a diagrammatic, sectional view through the membrane plate according to the invention in contact with the chamber plate according to the invention.

Finally, FIG. 4 shows part of a plate stack 37 according to the invention, with the membrane plate 13 according to the invention and with the chamber plate 27 according to the invention bearing on the latter. By a press pressure, the two plates 13, 27 contact one another in the region of their plate margins 15, 29, with the result that the bead 4 of the membrane 1 is firmly fixed in the groove 5 of the membrane carrier plate 2. A filtration chamber 38 is formed between the chamber plate 27 and the membrane 1 of the membrane plate 13. When, during press filtration, the pressure chamber 17 is filled by a non-illustrated pressure medium connection present in the membrane carrier plate 2, the membrane 1 presses onto the filter cake in the direction of the chamber plate 27. The planar region 12 of the membrane 1 is in this case disposed and dimensioned in such a way that, in the case of a sufficiently high pressure, it is laid onto the inflow orifice 34 and at the same time overlaps orifice margins 39 of the latter. A penetration of the membrane 1 into the inlet orifice 34 is thereby ruled out.

We claim:

1. A membrane for a membrane plate of a filter press, the membrane comprising:
   a membrane surface without perforations and having a plurality of supporting elements selected from the group consisting of ribs and bosses, said supporting elements each having a given surface;
   a membrane margin enclosing said membrane surface; and
   at least one planar region disposed spaced apart from said membrane margin and having a surface larger than said given surface of one of said supporting elements and positioned disposed opposite to and in combination with a sludge inflow of a chamber plate in a final mounting state of the membrane plate, said planar region havinq a reinforcement and said reinforcement being a thickening of a membrane material of said planar region.

2. The membrane according to claim 1, wherein said reinforcement is an insert of a reinforcing material into said membrane material.

3. The membrane according to claim 1,
   further comprising a membrane carrier plate having a groove formed therein;
   wherein said membrane margin has a peripheral bead engaging said groove of said membrane carrier plate; and
   further comprising a sealing lip integrally formed firmly on said peripheral bead.

4. The membrane according to claim 3, further comprising a sealing strip formed on said peripheral bead.

5. The membrane according to claim 4, wherein said peripheral bead is disposed so as to face away from said sealing lip.

6. The membrane according to claim 3, wherein said peripheral bead is made of a bead material being identical to said membrane material.

7. The membrane according to claim 6, wherein said bead material has a Shore hardness of about 90° ShA.

8. The membrane according to claim 6, wherein said sealing lip is formed of a material having a lower Shore hardness than said bead material.

9. The membrane according to claim 3, wherein said peripheral bead has a U-shaped holding projection, and said sealing lip is integrally formed on an outer lower edge of said U-shaped holding projection.

10. The membrane according to claim 3, wherein:
    said sealing lip is formed of a given material; and
    said peripheral bead is formed of a bead material configured differently than said given material of said sealing lip in terms of color.

11. A membrane plate for a filter press, comprising:
    a membrane containing:
      a membrane surface without perforations and having a plurality of supporting elements selected from the group consisting of ribs and bosses, said supporting elements each having a given surface;
      a membrane margin enclosing said membrane surface;
      at least one planar region disposed spaced apart from said membrane margin and having a surface larger than said given surface of one of said supporting elements, said planar region having a reinforcement and said reinforcement being a thickening of a membrane material of said planar region; and
      a peripheral bead extending from said membrane margin; and
    a membrane carrier plate having a plate margin for contacting at least one chamber plate to form a filtration chamber, said membrane carrier plate having a peripheral groove formed therein and said peripheral bead of said membrane disposed in said peripheral groove;
    said at least one planar region positioned disposed opposite to and in combination with a sludge inflow of said at least one chamber plate in a final mounting state of said membrane carrier plate.

12. The membrane plate according to claim 11, wherein the membrane plate has a longitudinal center axis and is constructed mirror-symmetrically about said longitudinal center axis.

13. A chamber plate for a filter press, comprising:
    a chamber plate body with a chamber plate margin for contacting at least one membrane plate according to claim 11 for forming a filtration chamber; and
    a plurality of sludge inflows, each of said sludge inflows having an inflow orifice formed therein and spaced apart from said chamber plate margin for introducing a suspension into the filtration chamber and an outlet duct extending in a region of said inflow orifice substantially perpendicularly to a longitudinal direction of the chamber plate.

14. The chamber plate according to claim 13, wherein:
    said chamber plate body further has a sealing margin slope and an inflow duct formed in said chamber plate body, said inflow duct extends from said chamber plate margin into said sealing margin slope; and
    said inflow orifice adjoins said an inflow duct.

15. The chamber plate according to claim 13, wherein the chamber plate has a longitudinal center axis and is constructed mirror-symmetrically about said longitudinal center axis.

16. A plate stack for a filter press, the plate stack comprising:
    a plurality of membrane plates each containing:
      a membrane including;
        a membrane surface without perforations and having a plurality of supporting elements selected from the group consisting of ribs and bosses, said supporting elements each having a given surface;
        a membrane margin enclosing said membrane surface;
        at least one planar region disposed spaced apart from said membrane margin and having a surface larger than said given surface of one of said supporting elements; and
        a peripheral bead extending from said membrane margin; and
      a membrane carrier plate having a plate margin with a peripheral groove formed therein and said peripheral bead of said membrane being disposed in said peripheral groove; and
    a plurality of chamber plates each having a plurality of sludge inflows each with an inflow orifice formed therein and disposed substantially opposite said planar region of said membrane, each of said membrane plates contacting at least one of said chamber plates for forming a filtration chamber.

17. The plate stack according to claim 16, wherein each of said chamber plates contains:
   a chamber plate body with a chamber plate margin for contacting at least one of said membrane plates for forming said filter chamber; and
   said inflow orifice spaced apart from said chamber plate margin for introducing a suspension into said filtration chamber and an outlet duct extending in a region of said inflow orifice substantially perpendicularly to a longitudinal direction of said chamber plate.

18. The plate stack according to claim 16, wherein said planar region of said membranes is disposed and configured to completely cover said inflow orifice.

19. A filter press, comprising:
   a plate stack containing:
      a plurality of membrane plates each containing:
         a membrane including;
            a membrane surface without perforations and having a plurality of supporting elements selected from the group consisting of ribs and bosses, said supporting elements each having a given surface;
            a membrane margin enclosing said membrane surface;
            at least one planar region disposed spaced apart from said membrane margin and having a surface larger than said given surface of one of said supporting elements; and
            a peripheral bead extending from said membrane margin; and
         a membrane carrier plate having a plate margin with a peripheral groove formed therein and said peripheral bead of said membrane being disposed in said peripheral groove; and
      a plurality of chamber plates each having a plurality of sludge inflows each with an inflow orifice formed therein and disposed substantially opposite said plane region of said membrane, each of said membrane plates contacting at least one of said chamber plates for forming a filtration chamber.

* * * * *